US006873626B2

(12) United States Patent
Hayashi et al.

(10) Patent No.: US 6,873,626 B2
(45) Date of Patent: Mar. 29, 2005

(54) CONTROL SYSTEM, CONTROL METHOD, AND RADIO NETWORK CONTROLLER PREFERABLY USED FOR THE SYSTEM AND METHOD

(75) Inventors: Takahiro Hayashi, Yokosuka (JP); Yoshihiro Ishikawa, Yokosuka (JP); Mikio Iwamura, Tokyo (JP)

(73) Assignee: NTT DoCoMo, Inc., Tokyo (JP)

(*) Notice: Subject to any disclaimer, the term of this patent is extended or adjusted under 35 U.S.C. 154(b) by 335 days.

(21) Appl. No.: 10/285,574

(22) Filed: Nov. 1, 2002

(65) Prior Publication Data
US 2003/0086389 A1 May 8, 2003

(30) Foreign Application Priority Data

Nov. 2, 2001 (JP) ........................................ 2001-338442
Oct. 18, 2002 (JP) ........................................ 2002-305061

(51) Int. Cl.[7] .............................. H04J 3/22; H04J 3/00; H04B 7/216; H04Q 7/00
(52) U.S. Cl. ...................... 370/465; 370/337; 370/342; 370/332; 455/522
(58) Field of Search ................................ 370/328, 338, 370/337, 342, 441, 442, 465, 332, 401, 392; 445/522, 69, 127.1

(56) References Cited

U.S. PATENT DOCUMENTS 5,991,618 A    11/1999  Hall
6,690,944 B1 *  2/2004  Lee et al. .................... 455/522
6,728,233 B1 *  4/2004  Park et al. ................... 370/342

FOREIGN PATENT DOCUMENTS

EP        0 986 282      3/2000
WO        WO 01/47146    6/2001

OTHER PUBLICATIONS

3GPP TS 25.211, vol. 3.7.0, pp. 1–45, XP–002902457, 3rd Generation Partnership Project; Technical Specification Group Radio Access Network; Physical Channels and Mapping of Transport Channels onto Physical Channels (FDD), Jun. 2001.

* cited by examiner

*Primary Examiner*—Duc Ho
(74) *Attorney, Agent, or Firm*—Oblon, Spivak, McClelland, Maier & Neustadt, P.C.

(57) ABSTRACT

It is an object of the present invention to provide a control system making it possible to maintain communication quality, decrease transmission delay, and simultaneously connect with numerous mobile stations 40. The present invention is a control system for controlling the information rate through a downlink shared channel (DSCH) addressed to the mobile stations 40, which is provided with a transmission power control information receiving unit 23 for receiving the transmission power control information for a downlink dedicated channel (A-DPCH) transmitted through an uplink dedicated channel (DPCH), transmission power control information accumulating unit 23 for accumulating the transmission power control information for the downlink dedicated channel, and information rate controlling unit 22 for controlling the information rate through a downlink shared channel addressed to the mobile stations 40 according to the accumulated value of the transmission power control information for the downlink dedicated channel.

15 Claims, 7 Drawing Sheets

FIG. 4

| ACCUMULATED VALUE C | INFORMATION RATE | |
|---|---|---|
| MORE THAN $+C_4$ | $R_0$ | kbps |
| $+C_3$ OR MORE AND LESS THAN $+C_4$ | $R_1$ | kbps |
| $+C_2$ OR MORE AND LESS THAN $+C_3$ | $R_2$ | kbps |
| $+C_1$ OR MORE AND LESS THAN $+C_2$ | $R_3$ | kbps |
| $+C_0$ OR MORE AND LESS THAN $+C_1$ | $R_4$ | kbps |
| $-C_1$ OR MORE AND LESS THAN $+C_0$ | $R_4$ | kbps |
| LESS THAN $-C_1$ | $R_4$ | kbps |

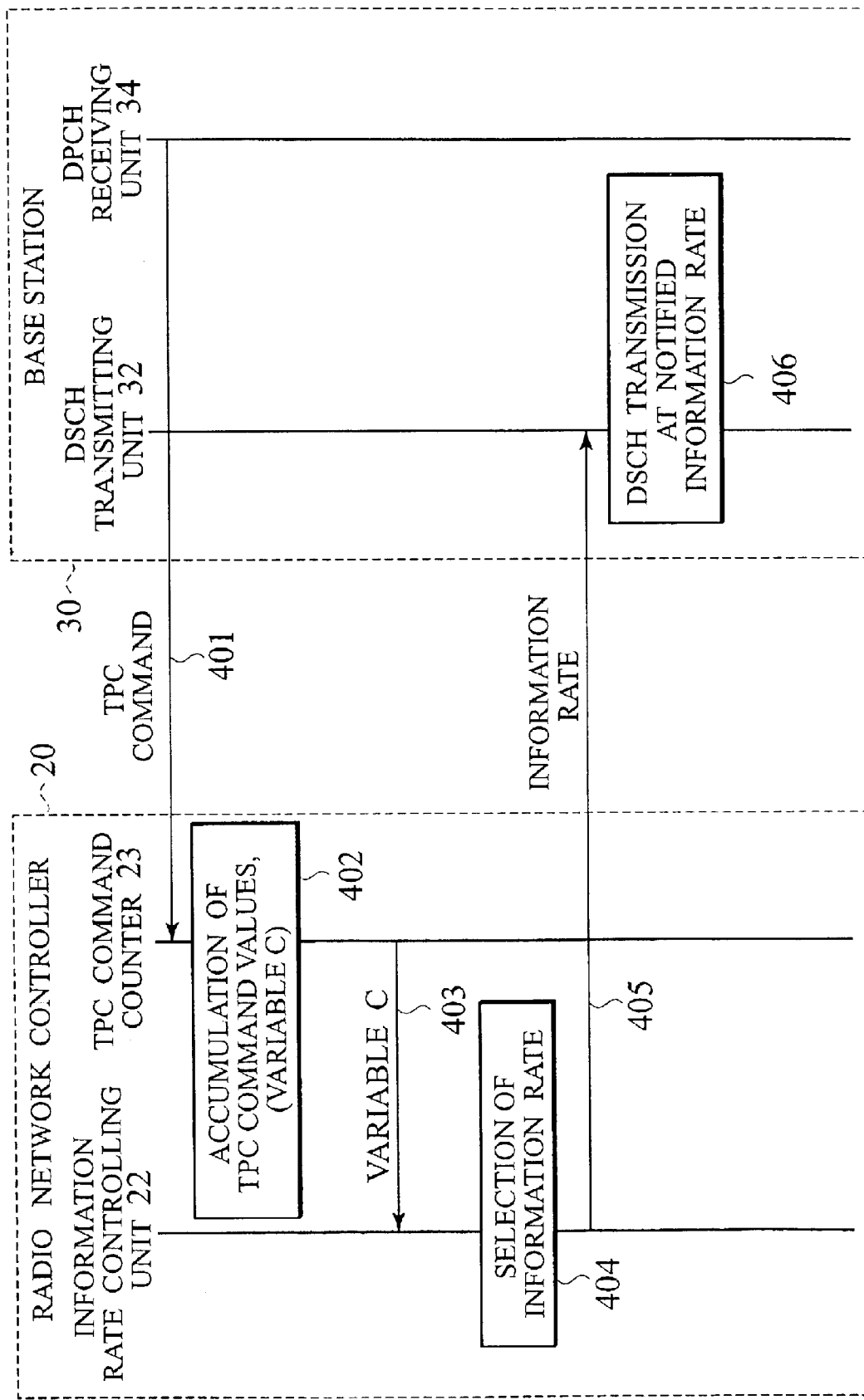

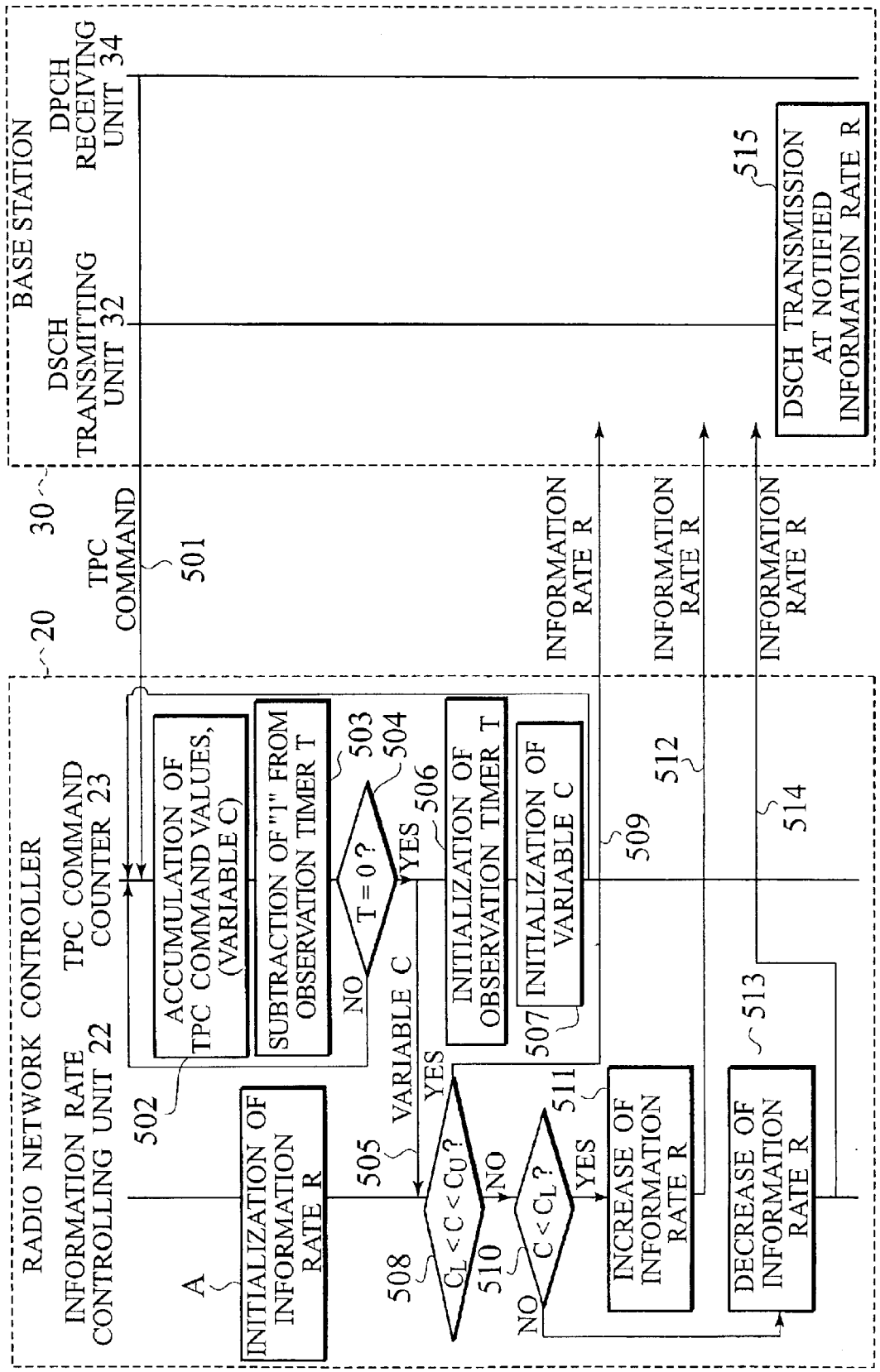

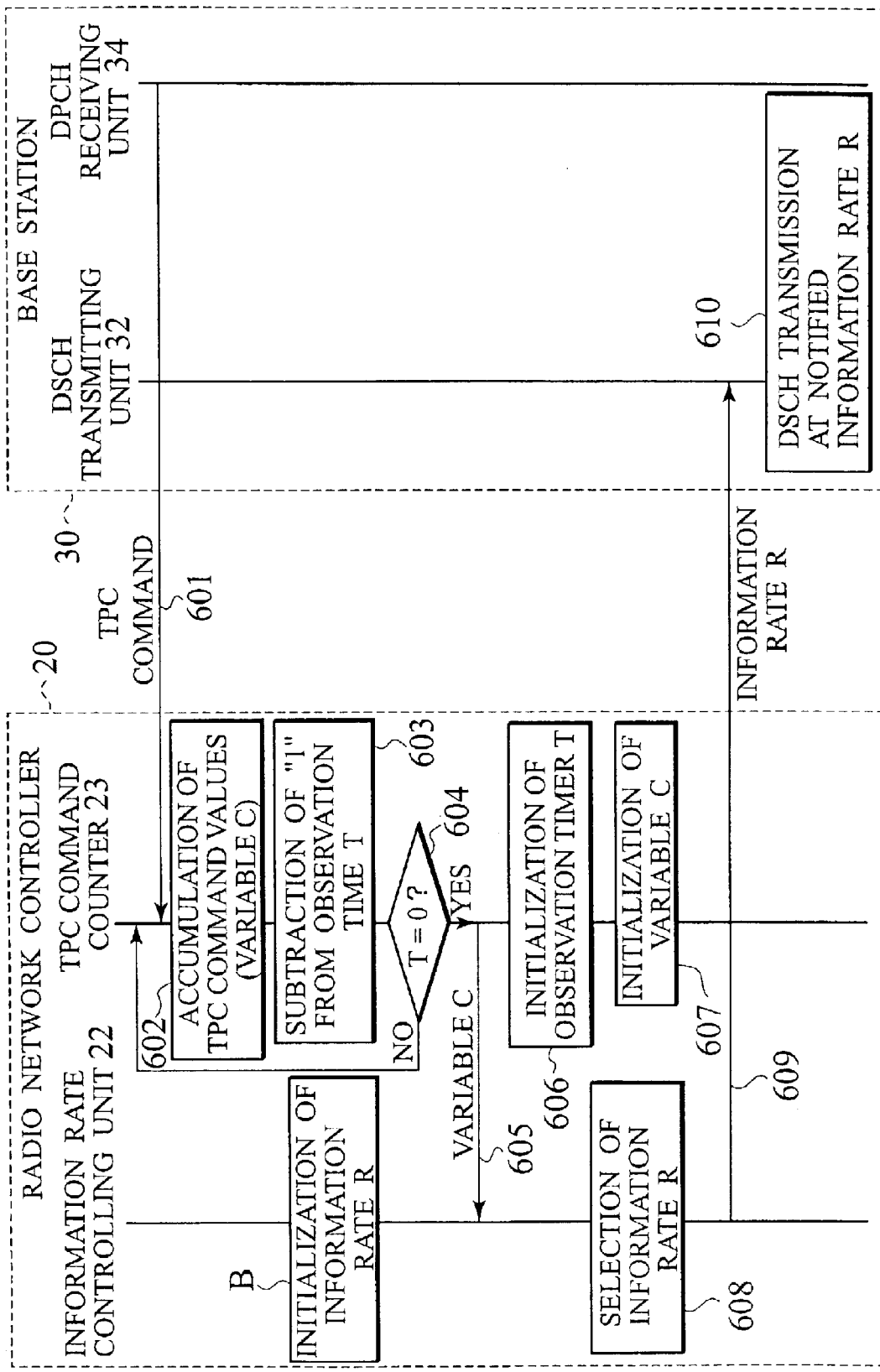

CONTROL SYSTEM, CONTROL METHOD, AND RADIO NETWORK CONTROLLER PREFERABLY USED FOR THE SYSTEM AND METHOD

CROSS REFERENCE TO RELATED APPLICATIONS

This applications is based upon and claims the benefit of priority from the prior Japanese Patent Applications No. P2001-338442 filed on 2, Nov. 2001 and No. P2002-305061 filed on 18, Oct. 2002, the entire contents of which are incorporated herein by reference.

BACKGROUND OF THE INVENTION

1. Field of the Invention

The present invention relates to a control system and control method for controlling an information rate (of data signal) in a mobile communication system and a radio network controller preferably used for the system and method.

Particularly, the present invention relates to a control system and control method for controlling an information rate through a downlink addressed to a mobile station in a mobile packet communication system and a radio network controller.

2. Description of the Related Art

A conventional mobile packet communication system addresses time-division multiplexed data signals to a plurality of users (mobile stations) on a single radio channel (hereafter referred to as a channel) and transmits the data signals to the users from a viewpoint of the efficiency of frequency utilization, delay tolerance in packet communication, and the saving of code resources in downlink.

FIG. 1 shows a channel configuration for a conventional packet communication system specified in 3GPP (Third Generation Partnership Project).

The channel configuration shown in FIG. 1 uses a downlink shared channel (DSCH) for time-division-multiplexing and transmitting data signals addressed to mobile stations $40_1$ and $40_2$ through a downlink.

The channel configuration shown in FIG. 1 uses an associated dedicated physical channel (A-DPCH) for transmitting control signals addressed to the mobile stations $40_1$ and $40_2$ through a downlink.

Moreover, the channel configuration shown in FIG. 1 uses a dedicated physical channel (DPCH) for transmitting both data signals and control signals addressed to the mobile stations $40_1$ and $40_2$ in uplink because the possibility of exhaustion of code resources is very low in uplink and the necessity for using a shared channel such as the DSCH is low.

In this case, A-DPCH-1 and A-DPCH-2 are dedicated channels for a base station 30 to transmit a control signal to the mobile stations $40_1$ and $40_2$ respectively, which are always transmitted through code division multiplexing using codes different for each of the mobile stations $40_1$ and $40_2$.

Moreover, the DSCH is a shared channel for the base station 30 to transmit data signals to the mobile stations $40_1$ and $40_2$ and is always transmitted through code-division multiplexing for changing the transmission timing for each of the mobile stations $40_1$ and $40_2$ using the same code.

In this case, to transmit data signals from the network (base station 30) to the mobile station $40_1$ or $40_2$ by using the DSCH, the message "DSCH is transmitted" is previously notified to the mobile station $40_1$ or $40_2$ through the radio frame of the A-DPCH before the radio frame of the DSCH.

Then, the mobile station $40_1$ or $40_2$ receiving the above notice starts receiving the DSCH only when it is determined that the DSCH is coming.

By using the above system, the base station 30 can freely change the mobile stations $40_1$ and $40_2$ for transmitting data signals by using the DSCH.

In FIG. 1, the A-DPCH-1 and A-DPCH-2 and the DSCH are set as downlinks. However, the DSCH is not always set but is set only when the above notice is received through the A-DPCH-1 or A-DPCH-2.

Because a DSCH is discretely transmitted on a time base, it is impossible to apply closed-loop transmission power control to the DSCH. Therefore, closed-loop transmission power control is applied to a temporally-continuous downlink A-DPCH or uplink DPCH, the transmission power of the DSCH is controlled so as to interlock with the transmission power of the A-DPCH with a predetermined offset which is previously decided by a telecommunication operator.

For example, when the transmission power of the A-DPCH-1 addressed to the mobile station $40_1$ is 20 dBm at the time t and the DSCH is transmitted to the mobile station $40_1$ at the time t, the transmission power of the DSCH addressed to the mobile station $40_1$ at the time t becomes 30 dBm, if the above offset is equal to 10 dBm.

Moreover, for example, when the transmission power of the A-DPCH-2 addressed to the mobile station $40_2$ is 22 dBm at the time t+1, the transmission power of the DSCH addressed to the mobile station $40_2$ at the time t+1 similarly becomes 32 dBm.

Furthermore, in the case of a conventional mobile packet system specified in 3GPP, the information rate of the DSCH can be changed at every transmission time interval (TTI) at each of mobile stations $40_1$ and $40_2$.

However, it is unknown what can be used as a trigger to change an information rate of the DSCH at present, and an information rate set at the start of communication is not changed after the start of the communication.

However, there is a problem in that the operation of the above DSCH at a fixed information rate cannot follow a change of radio propagation conditions and thereby, the communication quality of the DSCH may be deteriorated.

That is, when the communication quality of the DSCH deteriorates, it is observed as a phenomenon such as an increased number of transmission errors (e.g. block errors) or increased transmission delay when viewed from mobile stations $40_1$ and $40_2$. To provide services, it is preferable to minimize the deterioration of communication quality.

On the other hand, if the communication quality of the DSCH is too high, an increased number of transmission errors (such as block errors) or increased transmission delay is not observed when viewed from the mobile station $40_1$ and thereby, a preferable communication environment is obtained.

However, because it is impossible to ignore the interference to the other mobile station $40_2$ of its Own cell or the mobile station 40 of the other cell, the above excess of quality is not preferable.

In general, it is a problem for a mobile packet communication system to maintain communication quality, decrease communication delay (increase an information rate), and simultaneously connect with numerous mobile stations 40 (accommodate more users). In this case, it is known that an information rate is proportional to a transmission power.

That is, it is known that when a high information rate is required, a large transmission power is needed and when communication is performed at a low information rate, only a small transmission power is necessary.

BRIEF SUMMARY OF THE INVENTION

Therefore, the present invention is made in view of the above, its object is to provide a control system and control method making it possible to maintain communication quality by estimating a radio propagation condition according to a downlink transmission power control command (TPC command) and dynamically controlling a DSCH information rate according to the estimated radio propagation condition, control transmission delay, and simultaneously connect with numerous mobile stations 40 (accommodate numerous users) in a mobile packet communication system for time-division-multiplexing and transmitting data signals addressed to a plurality of mobile stations 40 through a single channel (DSCH).

The first aspect of the present invention is a control system for controlling an information rate through a downlink shared channel addressed to a plurality of mobile stations in a mobile packet communication system for multiplexing and transmitting the data signals addressed to the mobile stations through the downlink shared channel, transmitting control signals addressed to the mobile stations through a downlink dedicated channel, and receiving the data signals and the control signals from the mobile stations through an uplink dedicated channel, comprising; a transmission power control information receiving unit for receiving the transmission power control information for the downlink dedicated channel included in the control signals transmitted through the uplink dedicated channel; a transmission power control information accumulating unit for accumulating the received transmission power control information for the downlink dedicated channel; and an information rate controlling unit for controlling the information rate through the downlink shared channel addressed to the mobile stations corresponding to the downlink dedicated channel, according to the accumulated value of the transmission power control information for the downlink dedicated channel.

In the case of the first aspect of the present invention, it is preferable that the transmission power control information accumulating unit obtains the accumulated value in a predetermined period; and the information rate controlling unit controls the information rate according to the accumulated value in the predetermined observation period.

In the case of the first aspect of the present invention, it is preferable that the transmission power control information accumulating unit accumulates first values which are positive values when the transmission power control information for the downlink dedicated channel designates increasing the transmission power of the downlink dedicated channel; and the transmission power control information accumulating unit accumulates second values which are negative values when the transmission power control information for the downlink dedicated channel designates decreasing the transmission power of the downlink dedicated channel.

In the case of the first aspect of the present invention, it is preferable that an equivalence table for relating the accumulated value with the information rate is included and the information rate controlling unit retrieves the equivalence table according to the accumulated value of the transmission power control information for the downlink dedicated channel and sets the information rate corresponding to the accumulated value.

In the case of the first aspect of the present invention, it is preferable that the information rate controlling unit decreases an information rate when the accumulated value of the transmission power control information for the downlink dedicated channel is a positive value and the information rate controlling unit increases the information rate when the accumulated value of the transmission power control information for the downlink dedicated channel is a negative value.

The second aspect of the present invention is a control method for controlling the information rate through a downlink shared channel addressed to a plurality of mobile stations in a mobile packet communication system for multiplexing and transmitting the data signals addressed to the mobile stations through the downlink shared channel, transmitting control signals addressed to the mobile stations through a downlink dedicated channel, and receiving the data signals and the control signals from the mobile stations through an uplink dedicated channel, comprising the steps; (a) receiving the transmission power control information for the downlink dedicated channel included in the control signals transmitted through the uplink dedicated channel, (b) accumulating the received transmission power control information for the downlink dedicated channel, and (c) controlling the information rate through the downlink shared channel addressed to the mobile stations corresponding to the downlink dedicated channel.

In the case of the second aspect of the present invention, it is preferable that the accumulated value in a predetermined observation period is obtained in the step (b); and the information rate is controlled according to the accumulated value in the predetermined observation period in the step (c).

In the case of the second aspect of the present invention, it is preferable to accumulate first values which are positive values when the transmission power control information for the downlink dedicated channel designates increasing the transmission power of the downlink dedicated channel, and to accumulate second values which are negative values when the transmission power control information for the downlink dedicated channel designates lowering the transmission power of the downlink dedicated channel in the step (b).

In the case of the second aspect of the present invention, it is preferable to retrieve an equivalence table for relating the accumulated value of the transmission power control information for the downlink dedicated channel and the information rate according to the accumulated value, and to set the information rate corresponding to the accumulated value of the transmission power control information for the downlink dedicated channel in the step (c).

In the case of the second aspect of the present invention, it is preferable that, the information rate is decreased when the accumulated value of the transmission power control information for the downlink dedicated channel is a positive value in the step (c); and the information rate is increased when the accumulated value of the transmission power control information for the downlink dedicated channel is a negative value in the step (c).

The third aspect of the present invention is a radio network controller used for a mobile packet communication system for multiplexing and transmitting data signals addressed to a plurality of mobile stations through a downlink shared channel, transmitting control signals addressed to the mobile stations through a downlink dedicated channel, and receiving the data signals and the control signals from the mobile stations through an uplink dedicated channel, comprising; a transmission power control information receiving unit for receiving the transmission power control information for the downlink dedicated channel included in the control signals transmitted through the uplink dedicated channel; a transmission power control information accumulating unit for accumulating the received transmission power control information for the downlink dedicated channel; and an information rate controlling unit for controlling the information rate through the downlink shared channel addressed to the mobile stations corresponding to the downlink dedicated channel.

In the case of the third aspect of the present invention, it is preferable that the transmission power control information accumulating unit obtains the accumulated value in a predetermined observation period; and the information rate controlling unit controls the information rate according to the accumulated value in the predetermined observation period.

In the case of the third aspect of the present invention, it is preferable that the transmission power control information accumulating unit accumulates first values which are positive values when the transmission power control information for the downlink dedicated channel designates increasing the transmission power of the downlink dedicated channel; and the transmission power control information accumulating unit accumulates second values which are negative values when the transmission power control information for the downlink dedicated channel designates decreasing the transmission power of the downlink dedicated channel.

In the case of the third aspect of the present invention, it is preferable an equivalence table for relating the accumulated value with the information rate is. included; and the information rate controlling unit retrieves the equivalence table according to the accumulated value of the transmission power control information for the downlink dedicated channel and sets an information rate corresponding to the accumulated value.

In the case of the third aspect of the present invention, it is preferable that the information rate controlling unit decreases the information rate when the accumulated value of the transmission power control information for the downlink dedicated channel is a positive value, and increases the information rate when the accumulated value of the transmission power control information for the downlink dedicated channel is a negative value.

BRIEF DESCRIPTION OF THE SEVERAL VIEWS OF THE DRAWINGS

FIG. 4 is an illustration showing an equivalence table of an information rate controlling unit set to a radio network controller of a control system of an embodiment of the present invention;

FIG. 5 is a time chart showing operations for dynamically controlling a DSCH information rate in a control system of an embodiment of the present invention;

FIG. 6 is a time chart showing operations for dynamically controlling a DSCH information rate in a control system of the present embodiment; and FIG. 7 is a time chart showing operations for dynamically controlling a DSCH information rate in a control system of the present embodiment.

DETAILED DESCRIPTION OF THE INVENTION (Configuration of the Control System of Embodiment of the Present Invention)

The configuration of a control system of an embodiment of the present invention is described below with reference to the accompanying drawings. The control system of the embodiment of the present invention controls an information rate through a downlink shared channel (DSCH) addressed to a plurality of mobile stations $40_1$ to $40n$ in a mobile packet communication system for time-division multiplexing and transmitting the data signals addressed to the mobile stations $40_1$ to $40_n$ through a downlink shared channel (DSCH), transmitting control signals addressed to the mobile stations $40_1$ to $40n$ through a downlink dedicated channel (A-DPCH), and receiving the data signals and the control signals from the mobile stations $40_1$ to $40n$ through an uplink dedicated channel (DPCH).

Figure 1:
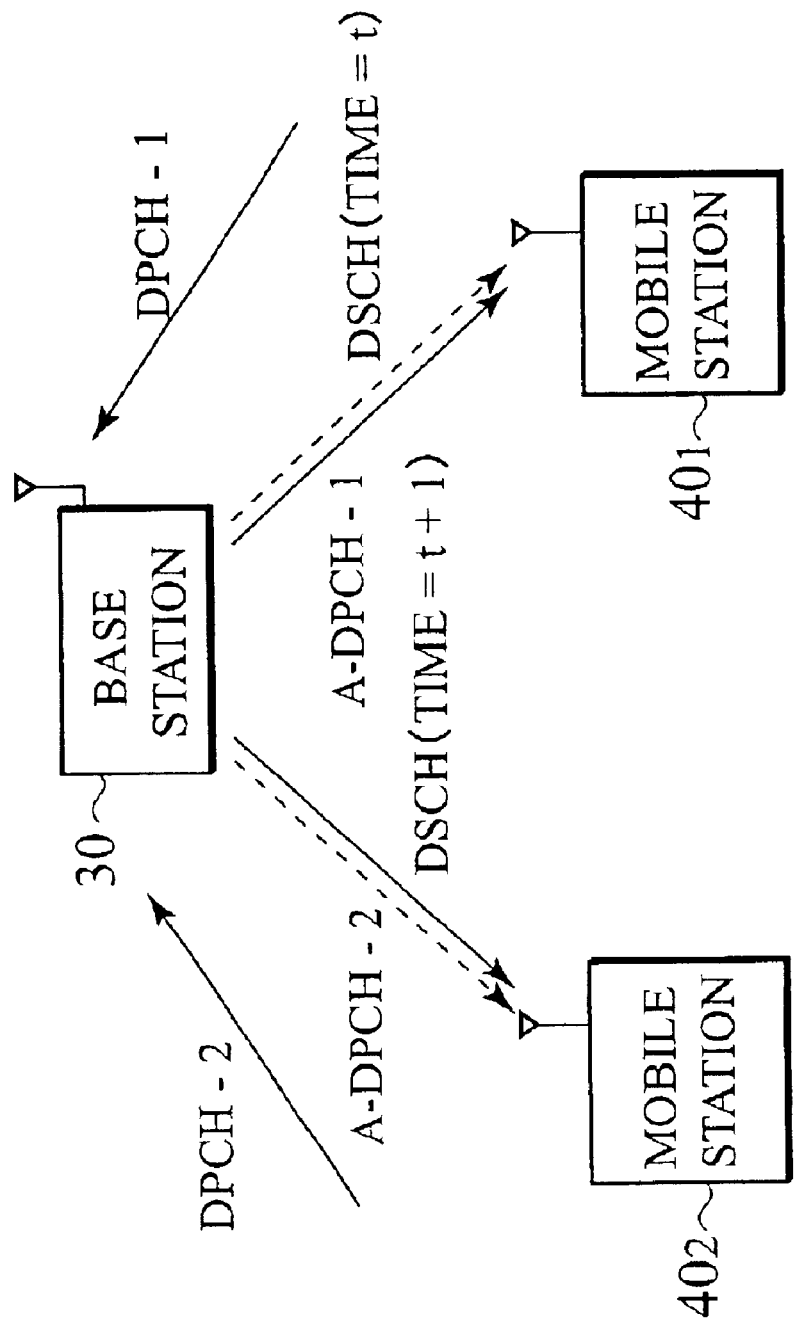
FIG. 1 is a schematic block diagram of a mobile packet communication system of the prior art.
Figure 2:
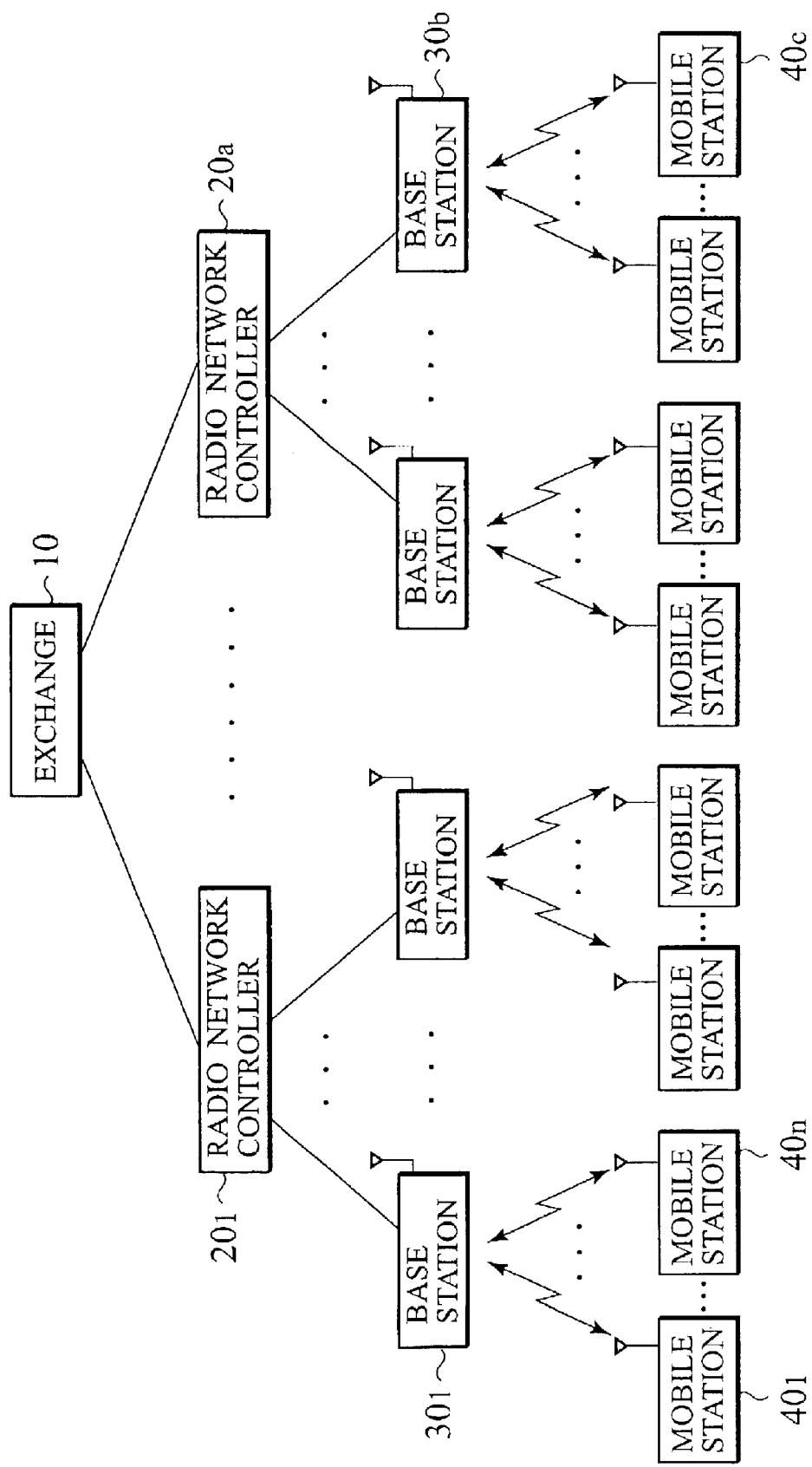
FIG. 2 is an illustration showing a configuration of the mobile packet communication system of the present embodiment.

FIG. 2 is an illustration showing a configuration of the mobile packet communication system of this embodiment. The configuration of the mobile packet communication system of this embodiment is the same as the configuration of a general mobile communication network.

As shown in FIG. 2, the mobile packet communication system of this embodiment is configured with an exchange 10, radio network controllers $20_1$ to $20_a$, base stations $30_1$ to $30_b$, and mobile stations $40_1$ to $40_c$ in the layered architecture.

The radio network controllers $20_1$ to $20a$ all have the same function, the base stations $30_1$ to $30_b$ all have the same function, and the mobile stations $40_1$ to $40_c$ all have the same function. Therefore, a representative (radio network controller 40, base station 30, and mobile station 40) of each of them is described below.

The exchange 10 is connected to the radio network controller 20 to exchange data signals.

The radio network controller 20 is connected to the exchange 10 and the base station 30 to control a plurality of base stations. For example, the radio network controller 20 designates a predetermined offset value between the transmission power of a DSCH and the transmission power of a A-DPCH and designates the information rate of the DSCH.

Each base station 30 performs radio communication (mobile packet communication) through a radio channel between the base station 30 and mobile station 40.

Figure 3:
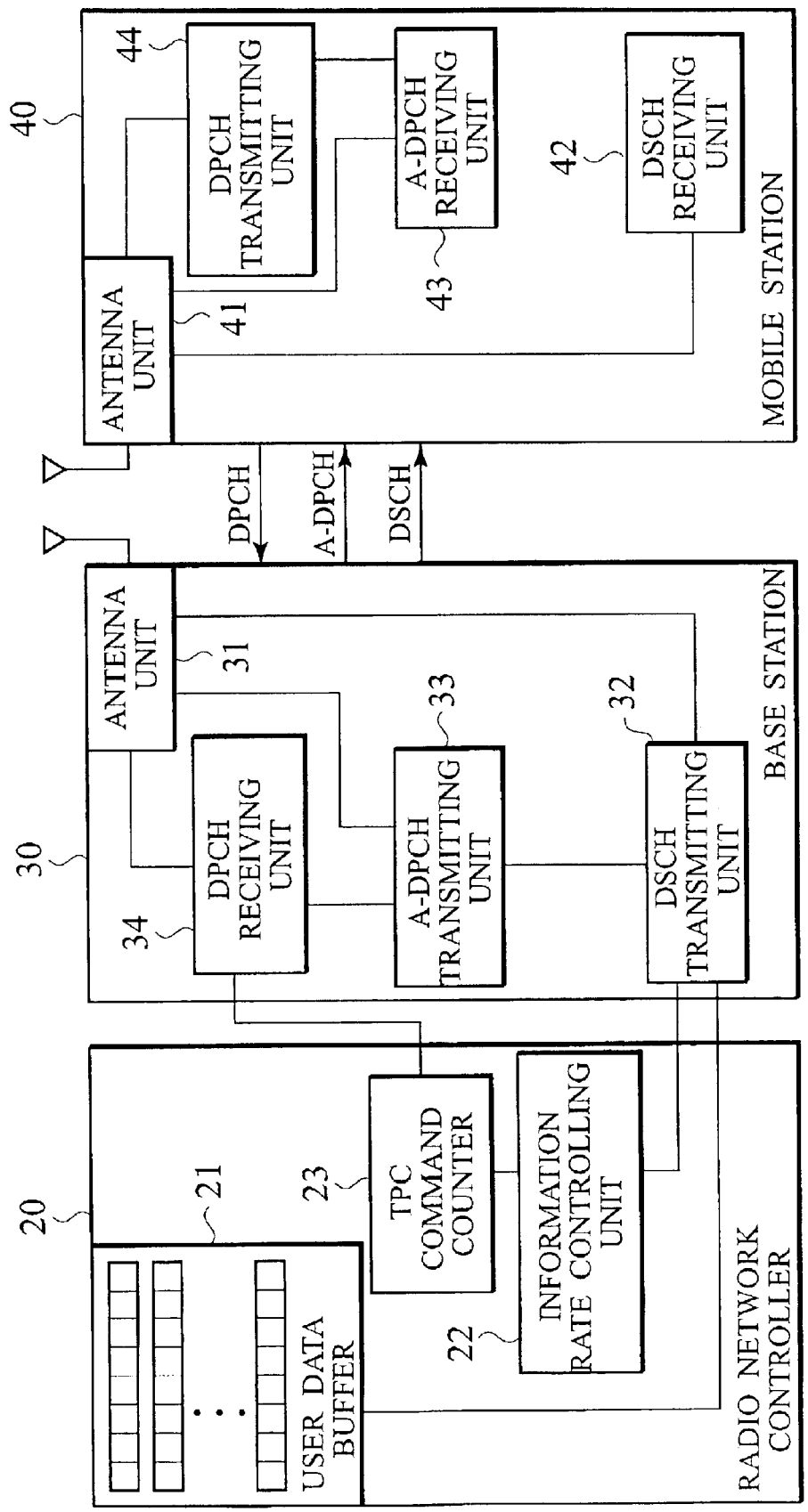
FIG. 3 is a functional block diagram of a radio network controller, base station, and mobile station constituting a control system of an embodiment of the present invention.

FIG. 3 shows functional blocks of the radio network controller 20, base station 30 and mobile stations 40 constituting the control system of this embodiment.

As shown in FIG. 3, a radio network controller 20 is configured with a user data buffer 21, information rate controlling unit 22, and TPC command counter 23.

In the case of this embodiment, the TPC command counter 23 constitutes a transmission power control information receiving unit for receiving the transmission power control information (TPC command) on a downlink dedicated channel (A-DPCH) included in control signals transmitted through an uplink dedicated channel (DPCH) and a transmission power control information accumulating unit for accumulating the received transmission power control information (TPC command) on the downlink dedicated channel (A-DPCH).

Moreover, the information rate controlling unit 22 constitutes an information rate controlling unit for controlling an information rate through a downlink shared channel (DSCH) addressed to mobile stations 40 corresponding to a downlink dedicated channel (A-DPCH) according to the accumulated value C of the transmission power control information (TPC commands) on the downlink dedicated channel (A-DPCH).

The user data buffer 21, which is connected to a DSCH transmitting unit 32 of a base station 30, temporarily stores data signals addressed to users (mobile stations $40_1$ to $40_n$) incoming from an exchange 10 and transfers the data signals to the DSCH transmitting unit 32. The user data buffer 21 is constituted by user data buffers #1 to #n for each user (each mobile station $40_1$ to $40_n$).

The information rate controlling unit 22 is connected to the TPC command counter 23 and the DSCH transmitting unit 32 of the base station 30, controls an information rate through a DSCH {an information rate through DSCH (DSCH information rate)} addressed to users (mobile stations $40_1$ to $40n$) according to the accumulated value C of TPC commands for each user (each of mobile stations $40_1$ to $40n$) notified from the TPC command counter 23.

Specifically, the information rate controlling unit 22 has an equivalence table for relating the "accumulated value C of TPC commands" with a "DSCH information rate" (refer to FIG. 4), retrieves a "DSCH information rate" corresponding to the "accumulated value C of TPC commands" according to the equivalence table shown in FIG. 4 corresponding to the accumulated value C of the TPC command for each user (each of mobile stations $40_1$ to $40_n$) notified from the TPC command counter 23, and transmits the retrieved "transmission rate of DSCH" to the DSCH transmitting unit 32 of the base station 30 as information rate control information.

The equivalence table shown in FIG. 4 is set so as to set a "DSCH information rate" to $R_0$ Kbps when the "accumulated value C of TPC commands" is more than $+C_4$, set the "DSCH information rate" to $R_1$ Kbps when the "accumulated value C of TPC commands" is kept at $+C_3$ or more and less than $+C_4$, set the "DSCH information rate" to $R_2$ Kbps when the "accumulated value C of TPC commands" is kept at $+C_2$ more and less than $+C_3$, set the "DSCH information rate" to $R_3$ Kbps when the "accumulated value C of TPC commands" is kept at $+C_1$ or more and less than $+C_2$, set the "DSCH information rate" to $R_4$ Kbps when the "accumulated value C of TPC commands" is kept at $+C_0$ or more and less than $+C_1$, set the "DSCH information rate" to $R_4$ Kbps when the "accumulated value C of TPC commands" is kept at $-C_1$ or more and less than $+C_0$, and set the DSCH information rate" to $R_4$ Kbps when the "accumulated value C of TPC commands" is less than $-C_1$.

In this case, a relation like $R_0<R_1<R_2<R_3<R_4$ is effectuated for the above DSCH information rate. Moreover, it is preferable to set the DSCH information rate to a smaller value as the accumulated value C increases and to a larger value as the accumulated value C decreases.

The information rate controlling unit 22 of this embodiment controls a DSCH information rate for each user (each of mobile stations $40_1$ to $40_n$).

The TPC command counter 23 is connected to the information rate controlling unit 22 and the DPCH receiving unit 34 of the base station 30, receives the downlink (A-DPCH) transmission power control information (TPC (Transmitter Power Control) command) transmitted from the DPCH receiving unit 34 of the base station 30 and transmits the accumulated value C of received TPC commands to the information rate controlling unit 22.

Specifically, when the received downlink TPC command designates raising the transmission power of the A-DPCH, the TPC command counter 23 adds "+1" to the accumulated value C and when the received downlink (A-DPCH) TPC command designates lowering the transmission power of the A-DPCH, the counter 23 adds "−1" to the accumulated value C.

As shown in FIG. 3, the base station 30 is configured with an antenna unit 3, a DSCH transmitting unit 32, an A-DPCH transmitting unit 33, and a DPCH receiving unit 34.

The antenna unit 31 is connected to the DSCH-transmitting unit 32, A-DPCH-transmitting unit 33, and DPCH-receiving unit 34.

Data signals supplied from the DSCH transmitting unit 32 and control signals supplied from the A-DPCH transmitting unit 33 are transmitted to the mobile station 40 through radio channels (DSCH and A-DPCH) via the antenna unit 31.

The antenna unit 31 receives the data signals and the control signals transmitted from the mobile station 40 through a radio channel (DPCH).

The DSCH transmitting unit 32 is connected to the antenna unit 31, A-DPCH transmitting unit 33, user data buffer 21 of the radio network controller 20, and information rate controlling unit 22. The DSCH transmitting unit 32 receives data signals from the user data buffer 21 and information rate control information from the information rate controlling unit 22, and transmits the received data signals to the antenna unit 31 at the "DSCH information rate" designated according to the information rate control information. In this case, the DSCH transmitting unit 32 receives the information showing an A-DPCH transmission power and decides a DSCH transmission power while interlocking with the A-DPCH transmission power.

The A-DPCH transmitting unit 33 is connected to the antenna unit 31, DSCH transmitting unit 32, and DPCH receiving unit 34. The A-DPCH transmitting unit 33 transmits the uplink (DPCH) TPC command transmitted from DPCH transmitting unit 34 to the antenna unit 31 as a control signal. Moreover, the A-DPCH transmitting unit 33 transmits the information showing the A-DPCH transmission power to the DSCH transmitting unit 31.

The DPCH receiving unit 34 is connected to the antenna unit 31, A-DPCH transmitting unit 33, and TPC command counter 23 of the radio network controller 20. The DPCH receiving unit 34 receives a radio signal (DPCH) from the DPCH transmitting unit 44 of the mobile station 40.

Moreover, the DPCH receiving unit 34 calculates the received SIR (Signal to Interference Power Ratio) of a received DPCH, compares the received SIR with a target SIR, and generates an uplink (DPCH) TPC command according to the comparison result.

Specifically, when the received SIR is higher than the target SIR, the DPCH receiving unit 34 generates an uplink (DPCH) TPC command for designating lowering a DPCH transmission power and when the received SIR is lower than the target SIR, the DPCH receiving unit 34 generates an uplink (DPCH) TPC command for designating raising the DPCH transmission power.

The DPCH receiving unit 34 transmits the generated uplink (DPCH) TPC command to the A-DPCH transmitting unit 33.

Moreover, the DPCH receiving unit 34 extracts a downlink (A-DPCH) TPC command from a control signal transmitted from the DPCH transmitting unit 44 of the mobile station 40 and transmits the extracted downlink (A-DPCH) TPC command to the TPC command counter 23.

As shown in FIG. 3, the mobile station 40 is configured with an antenna unit 41, DSCH receiving unit 42, A-DPCH receiving unit 43, and DPCH transmitting unit 44.

The antenna unit 41 is connected to the DSCH receiving unit 42, A-DPCH receiving unit 43, and DPCH transmitting unit 44.

Data signals and control signals supplied from the DPCH transmitting unit 44 are transmitted to the base station 30 through a radio channel (DPCH) via the antenna unit 41.

The antenna unit 41 receives data signals and control signals transmitted from the base station 30 through radio channels (DSCH and A-DPCH).

The DSCH receiving unit 42 is connected to the antenna unit 41, and receives data signals transmitted from the DSCH transmitting unit 32 of the base station 30 through the antenna unit 41.

The A-DPCH-receiving unit 43 is connected to the antenna unit 41, and receives control signals transmitted from the A-DPCH transmitting unit 33 of the base station 30 through the antenna unit 41.

The A-DPCH receiving unit 43 calculates the received SIR of the received A-DPCH, compares the received SIR with a target SIR, and generates a downlink (A-DPCH) TPC command.

Specifically, the A-DPCH receiving unit 43 generates a downlink (A-DPCH) TPC command for designating lowering an A-DPCH transmission power when the received SIR is higher than the target SIR and a downlink (A-DPCH) TPC command for designating raising the A-DPCH transmission power when the received SIR is lower than the target SIR.

Moreover, the A-DPCH receiving unit 43 transmits the generated downlink (A-DPCH) TPC command to the DPCH transmitting unit 44.

The DPCH transmitting unit 44 is connected to the antenna unit 41 and A-DPCH receiving unit 43. The DPCH transmitting unit 44 transmits data signals and control signals to the base station 30 through the antenna unit 41. Moreover, the DPCH transmitting unit 44 transmits a downlink (A-DPCH) TPC command transmitted from the A-DPCH receiving unit 43 to the base station 30 as a control signal.

(Operations of the Control System of this Embodiment)

Operations of the control system of this embodiment are described below with reference to the accompanying drawings. FIG. 5 is a flowchart showing operations for dynamically controlling a DSCH information rate in the control system of this embodiment.

As shown in FIG. 5, in step 401, the DPCH receiving unit 34 of the base station 30 transmits a downlink (A-DPCH) TPC command received from the DPCH transmitting unit 44 of a specific mobile station 40. Then, the TPC command counter 23 of the radio network controller 20 receives the downlink (A-DPCH) TPC command.

In step 402, when the received downlink (A-DPCH) TPC command designates raising an A-DPCH transmission power, the TPC command counter 23 adds "+1" to the accumulated value C (variable C) and when the received downlink (A-DPCH) TPC command designates lowering the A-DPCH transmission power, it adds "−1" to the accumulated value C (variable C).

In step 403, the TPC command counter 23 transmits the accumulated value C (variable C) of TPC commands to the information rate controlling unit 22.

In step 404, the information rate controlling unit 22 selects a "DSCH information rate" corresponding to the "accumulated value C of TPC commands" based on the equivalence table shown in FIG. 4 according to the accumulated value C of TPC commands notified from the TPC command counter 23.

In step 405, the information rate controlling unit 22 transmits the selected "DSCH information rate" to the DSCH transmitting unit 32 of the base station 30 as information rate control information.

In step 406, the DSCH transmitting unit 32 transmits a DSCH to the mobile station 40 through the antenna unit 31 at the "DSCH information rate" designated according to the information rate control information received from the information rate controlling unit 22.

(Functions and Advantages of the Control System of this Embodiment)

According to the control system of this embodiment, the information rate controlling unit 22 controls the information rate through a DSCH addressed to the mobile station 40 corresponding to an A-DPCH according to the accumulated value C of A-DPCH TPC command.

Therefore, it is possible to dynamically control an information rate through a DSCH according to a radio propagation condition estimated according to the accumulated value C of TPC commands of an A-DPCH.

As a result, a mobile packet communication system makes it possible to maintain communication quality, decrease transmission delay, and connect with numerous mobile stations 40 (accommodate more users).

(Modification 1)

The configuration of a control system of modification 1 is the same as that of the control system of the above embodiment (refer to FIGS. 2 and 3).

The information rate controlling unit 22 of this embodiment sets a DSCH information rate according to the accumulated value C of TPC commands notified from the TPC command counter 23 and transmits the set DSCH information rate to the DSCH-transmitting unit 32.

Specifically, the information rate controlling unit 22 sets a DSCH information rate so as to decrease the DSCH information rate when the accumulated value C of TPC commands is equal to or more than a predetermined value $C_u$.

Moreover, when the accumulated value C of TPC commands is equal to or less than a predetermined value $C_L$, the information rate controlling unit 22 sets a DSCH information rate so as to increase the DSCH information rate.

Furthermore, when the accumulated value C of TPC commands is less than $C_u$ and larger than $C_L$, the information rate controlling unit 22 sets a DSCH information rate so as not to change the DSCH information rate.

The value $C_L$ is a negative value and the value $C_u$ is a positive value. Set values of $C_L$ and $C_u$ are changed according to the length of an observation timer T. For example, it is preferable that the value of $C_L$ is equal to −30 and that of $C_u$ is equal to +30.

When the accumulated value C is kept in a relation of $C_L < C < C_u$, it is determined that the accumulated value C is close to 0 and a state is observed in which a radio channel is not changed into a good state or bad state. That is, the vicinity of 0 is shown by values $C_L$ and $C_u$.

Operations of the control system of this modification are described below with reference to the accompanying drawings. FIG. 6 is a time chart showing operations for dynamically controlling a DSCH information rate in the control system of this modification.

As shown in FIG. 6, in step 501, the DSCH receiving unit 34 of the base station 30 transmits a downlink (A-DPCH) TPC command received from the DPCH transmitting unit 44 of a specific mobile station 40. Then, the TPC command counter 23 of the radio network controller 20 receives the downlink (A-DPCH) TPC command.

In step 502, when the received downlink (A-DPCH) TPC command designates raising an A-DPCH transmission power, the TPC command counter 23 adds "+1" to the accumulated value C (variable C) and when the received downlink (A-DPCH) TPC command designates lowering the A-DPCH transmission power, the TPC command counter 23 adds "−1" to the accumulated value C (variable C).

In step 503, the TPC command counter 23 subtracts an observation timer value T showing a predetermined observation period by "1".

In step 504, the TPC command counter 23 determines whether or not the observation timer value T is equal to "0". When the observation timer value T is not equal to "0", the operation returns to step 502 and when the observation timer value T is equal to "0", the operation advances to step 505.

In step 505, the TPC command counter 23 transmits the accumulated value C (variable C) of TPC commands to the information rate controlling unit 22.

In step 506, the TPC command counter 23 initializes the observation timer value T. In step 507, the TPC command counter 23 initializes the accumulated value C (variable C) with 0. Then, the operation returns to step 502.

In this case, when the information rate controlling unit 22 starts transmitting a DSCH to the mobile station 40 concerned (that is, in step A), it is assumed that the DSCH information rate addressed to the mobile station 40 concerned is initialized to a predetermined rate.

In step 508, the information rate controlling unit 22 determines whether or not the accumulated value C of TPC commands notified from the TPC command counter 23 is close to "0" and the relation of $C_L < C < C_u$ is effectuated.

When the accumulated value C of TPC commands is close to "0", the operation advances to step 509. When the accumulated value C of TPC commands is not close to "0", the operation advances to step 510.

In step 509, the information rate controlling unit 22 transmits the set "DSCH information rate R" to the DSCH transmitting unit 32 of the base station 30 as information rate control information. Then, the operation advances to step 515.

In step 510, the information rate controlling unit 22 determines whether or not the accumulated value C of TPC commands notified from the TPC command counter 23 is less than $C_L$.

When the accumulated value C of TPC commands is less than $C_L$, the operation advances to step 511. When the accumulated value C of TPC commands is not less than $C_L$, the operation advances to step 513.

In step 511, the information rate controlling unit 22 sets the DSCH information rate so as to raise the rate by one level (i.e. increase). Then, in step 512, the information rate controlling unit 22 transmits the set "DSCH information rate" to the DSCH transmitting unit 32 of the base station 30 as information rate control information. Then, the operation advances to step 515.

In step 513, the information rate controlling unit 22 set the DSCH information rate so as to lower the rate by one level (i.e. decease). Then, in step 514, the information rate controlling unit 22 transmits the set "DSCH information rate" to the DSCH transmitting unit 32 of the base station 30 as information rate control information. Then, the operation advances to step 515.

In step 515, the DSCH transmitting unit 32 transmits a DSCH to the mobile station 40 at the "DSCH information rate R" designated according to the information rate control information received from the information rate controlling unit 22 through the antenna unit 31.

(Modification 2)

The configuration of a control system of modification 2 is the same as that of the control system of the above embodiment (refer to FIGS. 2 and 3).

Operations of the control system of this modification are described with reference to the accompanying drawings. FIG. 7 is a time chart showing operations for dynamically controlling a DSCH information rate in the control system of this modification.

As shown in FIG. 7, in step 601, a DPCH receiving unit 34 of a base station 30 transmits a downlink (A-DPCH) TPC command received from a DSCH transmitting unit 44 of a specific mobile station 40. Then, a TPC command counter 23 of a radio network controller 20 receives the downlink (A-DPCH) TPC command.

In step 602, when the received downlink (A-DPCH) TPC command designates raising a DSCH transmission power, the TPC command counter 23 adds "+1" to the accumulated value C (variable C) and when the received downlink (A-DPCH) TPC command designates lowering the A-DPCH transmission power, it adds "−1" to the accumulated value C (variable C).

In step 603, the TPC command counter 23 subtracts an observation timer value T showing a predetermined observation period by "1".

In step 604, the TPC command counter 23 determines whether or not the observation timer value T is equal to "0". When the observation timer value T is not equal to "0", the operation returns to step 602 and when the observation timer value T is equal to "0", the operation advances to step 605.

In step 605, the TPC command counter 23 transmits the accumulated value C (variable C) of TPC commands to the information rate controlling unit 22.

In step 606, the TPC command counter 23 initializes the observation timer value T. In step 607, the TPC command counter 23 initializes the accumulated value C (variable C). Then, the operation returns to step 602.

In this case, when the information rate controlling unit 22 starts transmitting the DSCH addressed to the mobile station 40 concerned, it is assumed that the DSCH information rate addressed to the mobile station 40 concerned is initialized.

In step 608, the information rate controlling unit 22 selects a "DSCH information rate R" corresponding to the "accumulated value C of TPC commands" based on the equivalence table shown in FIG. 4 according to the accumulated value C of TPC commands notified from the TPC command counter 23.

In step 609, the information rate controlling unit 22 transmits the selected "DSCH information rate R" to the DSCH transmitting unit 32 of the base station 30 as information rate control information.

In step 610, the DSCH transmitting unit 32 transmits a DSCH to the mobile station 40 through an antenna unit 31 at the "DSCH information rate" designated according to the information rate control information received from the information rate controlling unit 22.

(Modification 3)

For the above embodiment and modifications 1 and 2, a case is described in which the DSCH information rate specified in the standard specification of 3GPP is controlled. However, the present invention is not restricted to the above case.

For example, the present invention can be applied to the control of an information rate of a general dedicated channel using no DSCH because a (closed-loop) transmission power control command (TPC command) is used.

As described above, the present invention can provide a control system and control system making it possible to maintain communication quality, decrease transmission delay, and simultaneously connect with numerous mobile stations 40 (accommodate more users) by estimating a radio-circuit state by a downlink transmission power control command and dynamically controlling a DSCH information rate according to the estimated radio-circuit state in a mobile packet communication system for time-division multiplexing and transmitting data signals addressed to a plurality of mobile stations 40 through a single channel (DSCH) and making DSCH transmission power interlock with transmission power with a predetermined offset.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concepts defined by the appended claims and their equivalents.

What is claimed is:

1. A control system for controlling the information rate through a downlink shared channel addressed to a plurality of mobile stations in a mobile packet communication system for multiplexing and transmitting data signals addressed to a plurality of mobile stations through the downlink shared channel, transmitting control signals addressed to each of the mobile stations through a downlink dedicated channel, and receiving the data signals and the control signals from the mobile stations through an uplink dedicated channel, comprising:

a transmission power control information receiving unit for receiving the transmission power control information for the downlink dedicated channel included in the control signals transmitted through the uplink dedicated channel;

a transmission power control information accumulating unit for accumulating the received transmission power control information for the downlink dedicated channel; and an information rate controlling unit for controlling the information rate through the downlink shared channel addressed to the mobile stations corresponding to the downlink dedicated channel according to the accumulated value of the transmission power control information for the downlink dedicated channel.

2. The control system according to claim 1, wherein the transmission power control information accumulating unit obtains the accumulated value in a predetermined observation period; and the information rate controlling unit controls the information rate according to the accumulated value in the predetermined observation period.

3. The control system according to claim 1, wherein the transmission power control information accumulating unit accumulates first values which are positive values when the transmission power control information for the downlink dedicated channel designates increasing the transmission power of the downlink dedicated channel; and the transmission power control information accumulating unit accumulates second values which are negative values when the transmission power control information for the downlink dedicated channel designates decreasing the transmission power of the downlink dedicated channel.

4. The control system according to claim 1, comprising an equivalence table for relating the accumulated value with the information rate; and wherein the information rate controlling unit retrieves the equivalence table according to the accumulated value of the transmission power control information for the downlink dedicated channel, and sets the information rate of the data signals corresponding to the accumulated value.

5. The control system according to claim 1, wherein the information rate controlling unit decreases the information rate when the accumulated value of the information rate control information for the downlink dedicated channel is a positive value, and the information rate controlling unit increases the information rate when the accumulated value of the information rate control information for the downlink dedicated channel is a negative value.

6. A control method for controlling the information rate through a downlink shared channel addressed to a plurality of mobile stations in a mobile packet communication system for multiplexing and transmitting the data signals addressed to the mobile stations through the downlink shared channel, transmitting control signals addressed to the mobile stations through a downlink dedicated channel, and receiving the data signals and the control signals from the mobile stations through an uplink dedicated channel, comprising the steps of:

(a) receiving the transmission power control information for the downlink dedicated channel included in the control signals transmitted through the uplink dedicated channel;

(b) accumulating the received transmission power control information for the downlink dedicated channel; and (c) controlling the information rate through the downlink shared channel addressed to the mobile stations corresponding to the downlink dedicated channel according to the accumulated value of the transmission power control information for the downlink dedicated channel.

7. The control method according to claim 6, wherein, in the step (b), the accumulated value in a predetermined observation period is obtained; and in the step (c), the information rate is controlled according to the accumulated value in the predetermined observation period.

8. The control method according to claim 6, wherein, in the step (b), the first values which are positive values are accumulated when the transmission power control information for the downlink dedicated channel designates increasing the transmission power of the downlink dedicated channel; and in the step (b), second values which are negative values are accumulated when the transmission power control information for the downlink dedicated channel designates decreasing the transmission power of the downlink dedicated channel.

9. The control method according to claim 6, wherein, in the step (c), an equivalence table for relating the accumulated value of the transmission power control information for the downlink dedicated channel with the information rate of the data signals is retrieved according to the accumulated value; and in the step (c), an information rate corresponding to the accumulated value of the transmission power control information for the downlink dedicated channel is set.

10. The control method according to claim 6, wherein, in the step (c), the information rate is decreased when the accumulated value of the transmission power control information for the downlink dedicated channel is a positive value; and in the step (c), the information rate is increased when the accumulated value of the transmission power control information for the downlink dedicated channel is a negative value.

11. A radio network controller used for a mobile packet communication system for multiplexing and transmitting data signals addressed to a plurality of mobile stations through a downlink shared channel, transmitting control signals addressed to the mobile stations through a downlink dedicated channel, and receiving the data signals and the control signals from the mobile stations through an uplink dedicated channel, comprising:

a transmission power control information receiving unit for receiving the transmission power control information for the downlink dedicated channel included in the control signals transmitted through the uplink dedicated channel;

a transmission power control information accumulating unit for accumulating the received transmission power control information for the downlink dedicated channel; and an information rate controlling unit for controlling the information rate through the downlink shared channel addressed to the mobile stations corresponding to the downlink dedicated channel according to the accumulated value of the transmission power control information for the downlink dedicated channel.

12. The radio network controller according to claim 11, wherein the transmission power control information accumulating unit obtains the accumulated value in a predetermined period; and the information rate controlling unit controls the information rate according to the accumulated value in the predetermined period.

13. The radio network controller according to claim 11, wherein the transmission power control information accumulating unit accumulates first values which are positive values when the transmission power control information for the downlink dedicated channel designates increasing the transmission power of the downlink dedicated channel; and the transmission power control information accumulating unit accumulates second values which are negative values when the transmission power control information for the downlink dedicated channel designates decreasing the transmission power of the downlink dedicated channel.

14. The radio network controller according to claim 11, comprising an equivalence table for relating the accumulated value with the information rate; and wherein the information rate controlling unit retrieves the equivalence table according to the accumulated value of the transmission power control information for the downlink dedicated channel; and the information rate controlling unit sets an information rate corresponding to the accumulated value.

15. The radio network controller according to claim 11, wherein the information rate controlling unit decreases the information rate when the accumulated value of the transmission power control information for the downlink dedicated channel is a positive value; and the information rate controlling unit increases the information rate when the accumulated value of the transmission power control information for the downlink dedicated channel is a negative value.

* * * * *